US011036220B2

(12) United States Patent
Katou et al.

(10) Patent No.: US 11,036,220 B2
(45) Date of Patent: Jun. 15, 2021

(54) REMOTE AUTOMATIC TRAVEL SYSTEM, WIRELESS COMMUNICATION METHOD, AND MOVING BODY DEVICE

(71) Applicant: Panasonic Intellectual Property Management Co., Ltd., Osaka (JP)

(72) Inventors: Osamu Katou, Fukuoka (JP); Yasuhiro Aoyama, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 155 days.

(21) Appl. No.: 16/342,857

(22) PCT Filed: Aug. 23, 2017

(86) PCT No.: PCT/JP2017/030025
§ 371 (c)(1),
(2) Date: Apr. 17, 2019

(87) PCT Pub. No.: WO2018/079028
PCT Pub. Date: May 3, 2018

(65) Prior Publication Data
US 2019/0302760 A1    Oct. 3, 2019

(30) Foreign Application Priority Data
Oct. 27, 2016    (JP) .............................. JP2016-210947

(51) Int. Cl.
*G05D 1/00* (2006.01)
*B60W 30/095* (2012.01)
(Continued)

(52) U.S. Cl.
CPC ....... *G05D 1/0038* (2013.01); *B60W 30/0956* (2013.01); *G05D 1/0022* (2013.01);
(Continued)

(58) Field of Classification Search
CPC ...... G05D 1/0038; G05D 1/09; G05D 1/0022; G05D 1/0061; G05D 2201/0213;
(Continued)

(56) References Cited

U.S. PATENT DOCUMENTS 9,734,721 B2 *   8/2017   Stenneth .............. G08B 25/016
9,736,699 B1 *   8/2017   Rao ......................... H04W 4/80
(Continued)

FOREIGN PATENT DOCUMENTS

| JP | 2001-023090 A | 1/2001 |
| JP | 2004-295360 A | 10/2004 |
| JP | 2014-006689 A | 1/2014 |

OTHER PUBLICATIONS

The Strategic Headquarters for the Promotion of an Advanced Information and Telecommunications Network Society, "Public-Private ITS Initiative/Roadmaps 2016", May 20, 2016, Prime Minister of Japan and His Cabinet.

*Primary Examiner* — Dale W Hilgendorf
*Assistant Examiner* — Alexander C. Bost
(74) *Attorney, Agent, or Firm* — Seed IP Law Group LLP

(57) ABSTRACT

Provided is a remote-type autonomous traveling system in which a mobile body apparatus that has at least one camera and a remote operation terminal are communicatively connected. The mobile body apparatus includes an acquisition unit that acquires environmental information, a determination unit that determines whether or not a critical state is attained, based on the environmental information, and a communication unit that transmits data of an image that is captured by at least the camera to the remote operation terminal through a first wireless base station that is capable of providing a macro-cell, by performing communication in compliance with a first communication scheme, according to a result of the determination by the determination unit that the mobile body apparatus is in the critical state. The remote
(Continued)

operation terminal transmits a control signal for remotely causing the mobile body apparatus to travel autonomously, through the first wireless base station, according to the data of the image that is captured by the camera, which is transmitted from the movable body apparatus.

15 Claims, 7 Drawing Sheets

(51) Int. Cl.
*G06K 9/00* (2006.01)
*H04W 48/16* (2009.01)
*H04W 4/40* (2018.01)
*H04W 88/06* (2009.01)
*H04W 16/32* (2009.01)
*G08G 1/09* (2006.01)
*H04W 48/18* (2009.01)

(52) U.S. Cl.
CPC ....... *G05D 1/0061* (2013.01); *G06K 9/00805* (2013.01); *G08G 1/09* (2013.01); *H04W 4/40* (2018.02); *H04W 16/32* (2013.01); *H04W 48/16* (2013.01); *H04W 48/18* (2013.01); *H04W 88/06* (2013.01); *B60W 2420/42* (2013.01)

(58) Field of Classification Search
CPC .......... G06K 9/00805; G06K 9/00791; B60W 2420/42; B60W 30/0956; H04W 48/16; H04W 4/40; H04W 88/06; H04W 16/32; H04W 48/18; H04W 84/18; H04W 84/12; H04Q 2209/40; H04Q 9/00
See application file for complete search history.

(56) References Cited

U.S. PATENT DOCUMENTS

| | | | |
|---|---|---|---|
| 9,776,638 B1* | 10/2017 | Green | G05D 1/0022 |
| 10,674,369 B1* | 6/2020 | Rao | H04W 4/80 |
| 2016/0275790 A1* | 9/2016 | Kang | G07C 5/0866 |
| 2016/0277911 A1* | 9/2016 | Kang | H04B 1/3822 |
| 2018/0077602 A1* | 3/2018 | Kato | H04L 1/0003 |
| 2018/0199298 A1* | 7/2018 | Wakabayashi | H04W 56/0015 |
| 2018/0199299 A1* | 7/2018 | Wakabayashi | H04W 56/002 |
| 2018/0310158 A1* | 10/2018 | Kimura | H04W 48/18 |

* cited by examiner

FIG. 7

|  | USE OF CELLULAR SYSTEM SUCH AS LTE | | USE OF NON-CELLULAR SYSTEM SUCH AS WLAN | |
| --- | --- | --- | --- | --- |
|  | CRITICAL | NON-CRITICAL | CRITICAL | NON-CRITICAL |
| DELAY TIME (UPLINK ONE WAY) | 10ms | 200ms | 10ms | 200ms |
| REQUIRED CAPACITY | 60Mbps /0.01km$^2$ | 540Mbps /0.01km$^2$ | 60Mbps /0.01km$^2$ | 540Mbps /0.01km$^2$ |
| CANDIDATE COMMUNICATION SYSTEM CONFIGURATION | LTE MACRO CELL | WIRELESS MH IN LTE SMALL CELL OR WIRELESS MH IN WLAN SMALL CELL | WLAN MACRO CELL | WIRELESS MH IN WLAN SMALL CELL |

REMOTE AUTOMATIC TRAVEL SYSTEM, WIRELESS COMMUNICATION METHOD, AND MOVING BODY DEVICE

TECHNICAL FIELD

The present disclosure relates to a remote-type autonomous traveling system and a wireless communication method that remotely causes a movable body apparatus (for example, a vehicle) to travel autonomously and relates to a mobile body apparatus that is a target for remote autonomous traveling that is caused by the remote-type autonomous traveling system.

BACKGROUND ART

An Intelligent Transport System (ITS) (road traffic system) generally refers to a new road traffic system that is newly established as a system in which a person, a road, and a mobile body apparatus (for example, a vehicle) are integrally involved using the state-of-the-art Information Technology (IT) for the purpose of improving the road traffic safety, the transportation efficiency, and the comfortability and so on. For example, as disclosed in NPL 1, regarding the ITS, various studied on the realization of an autonomous traveling system for the mobile body apparatus (for example, the vehicle) have been rapidly made with recent developments in information communication technology and advances in data utilization in the background.

In NPL1, a safety driving support system and an autonomous traveling system are defined, and an information providing system and an autonomous control utilization system in which there are provided four levels from Level 1 to Level 4 in the hierarchy are described as substitutes for a vehicle guidance driver function. Of these levels, particularly Level 4 indicates fully autonomous traveling and is defined as a state where a system performs acceleration, steering, and braking in all and where a driver is not at all involved. In other words, in the fully autonomous traveling (driving) at Level 4, there is no need for a driver to be present within a vehicle.

Furthermore, in NPL 1, in addition to the fully autonomous traveling at Level 4, as a system that corresponds to autonomous travel at Level 4, one solution, that is, a remote-type autonomous traveling system is also studied in which, in the case of an emergency, a person in a remote location other than in the vehicle, who corresponds to the driver, remotely performs traveling control. In the remote-type autonomous traveling system that is disclosed in NPL 1, images that are captured by one or more cameras that are installed in the movable body apparatus (for example, the vehicle) needs to be transferred to a control apparatus (a remote cockpit) in a remote control location, and a delay time that is allowed for transfer of data of the captured image, for example, is required to be a short time on the order of 10 milliseconds (ms).

Moreover, for example, the vehicle that is disclosed in NPL 1 is driven by a remote operation, pieces of data relating to a traveling state of the vehicle, which are obtained by a vehicle wheel speed sensor, various sensor, and various camera that are installed within the vehicle, are sent to a control center, and a remote operator sends a command signal for remotely operating the vehicle based on the data that are sent, from the control center to a vehicle-mounted remote control apparatus within the vehicle. During wireless communication between the control center and the vehicle-mounted control apparatus, two different types of wireless communication systems, that is, a wide area communication and a narrow area, are used.

In PTL 1, although an abnormal state is entered where communication is not performed by one of the broad area communication system and a narrow area communication system, the control signal from the control center can be sent to the vehicle using the other communication system. Because of this, it is possible that the vehicle is remotely caused to travel.

However, in realizing the remote-type autonomous traveling system that corresponds to Level 4 (the fully autonomous traveling system), the images that are captured by one or more cameras which are installed in the vehicle are transferred to a remote cockpit. Because of this, it is difficult to accomplish the shortening to the delay time (for example, the order of 10 ms) that is allowed for the transfer of the pieces of data of the captured images.

Furthermore, when a situation is assumed where multiple vehicles travel actually on a road or the like, there is a high likelihood that a data transfer speed for images that are captured by multiple cameras, which are sent from one vehicle, will be, for example, a high data transfer speed of 10 or more Mbps. For this reason, in a case where the transfer of the data of the captured image is accommodated (processed) in a macro-cell base station that is capable of providing a macro-cell which has a comparatively large cell range, amounts of transfer data that are sent from multiple vehicles that travel within the macro-cell are increased. Thus, there is a likelihood that a system capacity (more precisely, a value of the sum of capacities for pieces of data that are handled in the macro-cell) of the macro-cell in the macro-cell base station will not be sufficient.

An object of the present disclosure is to suppress an increase in an allowable delay time for transfer of data of an image that is captured by a camera that is installed within a mobile body apparatus and to avoid the insufficiency of a system capacity of a macro-cell in a macro-cell base station.

CITATION LIST

Patent Literature

PTL 1; Japanese Patent Unexamined Publication No. 2004-295360

Non-Patent Literature

NPL 1; The Strategic Headquarters for the Promotion of an Advanced Information and Telecommunications Network Society, "Public-Private ITS Initiative/Roadmaps 2016", May 20, 2016, Prime Minister of Japan and His Cabinet

SUMMARY OF THE INVENTION

According to an aspect of the present disclosure, there is provided a mobile object apparatus that is communicatively connected to a remote operation terminal that remotely instructs autonomous traveling, the apparatus including; at least one camera; an acquisition unit that acquires environmental information on the mobile body apparatus; a determination unit that determines whether or not the mobile body apparatus is in a critical state, based on the environmental information on the mobile body apparatus; and a communication unit that transmits data of an image that is captured by at least the camera to the remote operation terminal through a first wireless base station that is capable of providing a macro-cell, by performing communication in compliance with a first communication scheme, according to a result of the determination by the determination unit that the mobile body apparatus is in the critical state.

According to another aspect of the present disclosure, there is provided a remote-type autonomous system including: a mobile body apparatus that has at least one camera; and a remote operation terminal that is communicatively connected to the mobile body apparatus, in which the mobile body apparatus includes an acquisition unit that acquires environmental information on the mobile body apparatus, a determination unit that determines whether or not the mobile body apparatus is in a critical state, based on the environmental information on the mobile body apparatus, and a communication unit that transmits data of an image that is captured by at least the camera to the remote operation terminal through a first wireless base station that is capable of providing a macro-cell, by performing communication in compliance with a first communication scheme, according to a result of the determination by the determination unit that the mobile body apparatus is in the critical state, and in which the remote operation terminal transmits a control signal for remotely causing the mobile body apparatus to travel autonomously, to the mobile body apparatus through the first wireless base station, according to the data of the image that is captured by the camera, which is transmitted from the movable body apparatus.

According to still another aspect of the present disclosure, there is provided a wireless communication method in a remote-type autonomous traveling system in which a mobile body apparatus that has at least one camera and a remote operation terminal are communicatively connected, the method including: processing that causes the mobile body apparatus to acquire an environmental information on the mobile body apparatus; processing that causes the mobile body apparatus to determine whether or not the mobile body apparatus is in a critical state, based on the environmental information on the mobile body apparatus; processing that causes the mobile body apparatus to transmit data of an image that is captured by at least the camera to the remote operation terminal through a first wireless base station that is capable of providing a macro-cell, by performing communication in compliance with a first communication scheme, according to a result of the determination by the determination unit that the mobile body apparatus is in the critical state; and processing that causes the remote operation terminal to transmit a control signal for remotely causing the mobile body apparatus to travel autonomously, to the mobile body apparatus through the first wireless base station, according to the data of the image that is captured by the camera, which is transmitted from the movable body apparatus.

According to the present disclosure, an increase in an allowable delay time for transfer of data of an image that is captured by a camera that is installed within a mobile body apparatus can be suppressed, and the insufficiency of a system capacity of a macro-cell in a macro-cell base station can be avoided.

BRIEF DESCRIPTION OF DRAWINGS

FIG. 7 is a diagram illustrating a table showing an example of the use of the remote-type autonomous traveling system according to the present embodiment.

DESCRIPTION OF EMBODIMENTS

Figure 1:
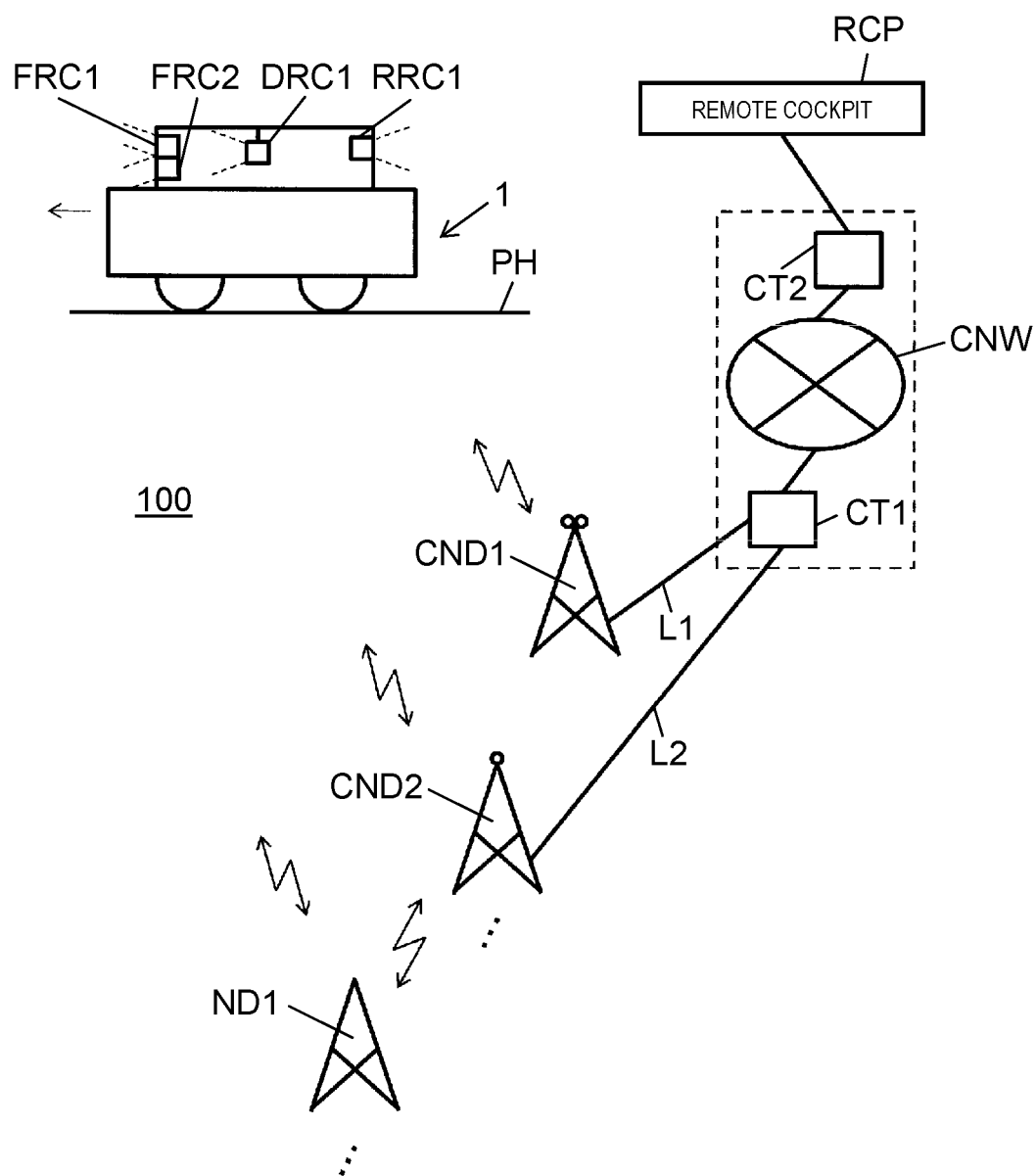
FIG. 1 is a diagram illustrating an example of a systematic configuration of a remote-type autonomous traveling system according to the present embodiment.

<Circumstance that Leads to the Details of the Present Embodiment>

First, before describing an embodiment (hereinafter referred to as "present embodiment) for specific disclosure of a remote-type autonomous traveling system, a wireless communication method, a movable object, and a program, which are according to the present disclosure, a circumstance that leads to the details of the present embodiment will be described.

As described above, in a remote-type autonomous traveling system that is disclosed in NPL 1, images that are captured by one or more cameras that are installed in a mobile body apparatus (for example, a vehicle) needs to be transferred to a control apparatus (a remote cockpit) in a remote control location. Regarding a delay time that is allowed for transfer of data of the captured image, for example, a short time on the order of 10 milliseconds (ms) is required.

When it comes to a vehicle that is a target for remotely-operated autonomous traveling, although compression processing (encoding) is performed on the data (which, in some cases, is also referred to "image signal") of the captured image, a data transfer speed of several Mbps (for example, approximately 3 Mbps) is necessary for the image signal that is generated by one camera within one vehicle. For this reason, when it is assumed that multiple cameras are installed within one vehicle, on the vehicle side, image signals generated by each camera are put together on the vehicle and then the compression processing is collectively performed on the image signals. Although this is done, when the image signal generated by the camera is transmitted from one vehicle, a high data transfer speed of approximately 10 Mbps or higher is required. When the transfer of the image signal is accommodated (processed) in a wireless base station that is capable of providing a macro-cell that has a comparatively large cell radius (hereinafter referred to as "macro-cell base station"), there is a likelihood that a system capacity of a macro-cell will be insufficient in the macro-cell base station.

In order to avoid the insufficiency of the system capacity of the macro-cell, it is also considered that small cells that have a cell radius which is comparatively smaller than that of the macro-cell are installed at high density. However, it is necessary that a wired backhaul circuit (more precisely, a circuit between the small cell base station and a core network such as a wired network) is constructed for the wireless base station that is capable of providing the small cell (hereinafter referred to as "small cell base station").

Therefore, there is also a lack in the flexibility to secure an installation place of the small cell base station, such as a need for a complicated procedure for the installation of the small cell base station.

At this point, the installation of the small cell base station at high density and the transfer of the image signal to a remote operation terminal (hereinafter also referred to "remote cockpit") that remotely causes a vehicle to travel autonomously using wireless multi-hop communication between the small cell base stations are effective in that a system capacity (in other words, a value of the sum of amounts of data transfer within a cell) is increased and in that the wired backhaul circuit does not need to be constructed in an individual small cell base station. However, in the remote-type autonomous traveling system that uses the wireless multi-hop communication, when the number of small cell base stations as relay stations increases, it is difficult to satisfy a condition that an allowable delay time that it takes for the image signal from the vehicle to reach the remote cockpit is on the order of 10 ms.

Furthermore, in the remote-type autonomous traveling system, when the transfer of a large amount of image signal is always performed using a cellular system (in other words, cellular-based wireless standards) such as Long Term Evolution (LTE), there is also a likelihood that an amount of transferred data will increase massively, thereby also increasing communication fees to a large amount.

Accordingly, in the present embodiment that follows, an example of a remote-type autonomous traveling system will be described below in which the allowable delay time for the transfer of the pieces of data of the images captured by one or more cameras that are installed within the mobile body apparatus is suppressed from increasing and in which the insufficiency of the system capacity of the macro-cell in the macro-cell base station is avoided.

The present embodiment for specific disclosure of the remote-type autonomous traveling system, the wireless communication method, and the moving object, which are according to the present disclosure, will be described in detail below, suitably referring to the drawings. However, in some cases, a description more detailed than is necessary is omitted. For example, in some cases, a detailed description of an already-known matter is omitted, or substantially the same configuration is repeated. The reason for this is to avoid unnecessary redundancy of the following description and to help a person of ordinary skill in the art to achieve easy understanding. The accompanying drawings and the following description are provided in order for a person of ordinary skill in the art to get a sufficient understanding of the present disclosure, and therefore, this is not intended to impose a limitation on a subject matter that is recited in a claim. Furthermore, in the present embodiment that follows, in remote-type autonomous traveling system 100, in transmitting camera-captured image data from a vehicle, in addition to decreasing the delay time for a wireless transfer path or for a communication portion of the wired transfer path in order to achieve a short delay time, an attempt is also made to reduce a delay time required for coding or decoding an image to approximately several milliseconds (ms). However, in the present embodiment, the description is provided on the assumption that the delay time required for the coding or decoding of the image is possibly realized. Furthermore, the description is provided on the assumption that the delay time in the wired transfer path is suppressed in such a manner as to be shorter than the delay time in the wireless transfer path.

<Outline of the Remote-Type Autonomous Traveling System>

First, an outline of remote-type autonomous traveling system 100 according to the present embodiment is described with reference to FIG. 1.

FIG. 1 is a diagram illustrating an example of a systematic configuration of remote-type autonomous traveling system 100 according to the present embodiment.

As illustrated in FIG. 1, remote-type autonomous traveling system 100 is configured to include a mobile body apparatus (for example, vehicle 1 that travels on public road PH in the direction from right to left on the sheet on which FIG. 1 is drawn) that is the target for remotely-operated traveling, and a remote operation terminal (for example, remote cockpit RCP) that remotely instructs vehicle 1 to travel autonomously. An internal configuration of vehicle 1 will be described in detail below with reference to FIGS. 2 and 3. In the present embodiment, vehicle 1 is remotely caused to travel autonomously under the control of the remote cockpit RCP that will be described below, and multiple vehicle-mounted cameras (for example, four vehicle-mounted cameras, vehicle-mounted cameras FRC1, FRC2, DRC1, and RRC1) are installed.

Vehicle 1 is connected to remote cockpit RCP in a manner that data communication with remote cockpit RCP is possible, through macro-cell base station CND1, communication apparatus CT1, core network CNW, and communication apparatus CT2. In other words, remote cockpit RCP is connected to vehicle 1 in a manner that the data communication with vehicle 1, through communication apparatus CT2, core network CNW, communication apparatus CT1, and macro-cell base station CND1. A type of communication that uses a connection from vehicle 1 to macro-cell base station CND1 is referred to as a single hop communication.

In the following description, each of communication apparatuses CT1 and CT2 is a communication apparatus (for example, a relay such as a router) that is connected to core network CNW through a wired circuit.

Macro-cell base station CND1, as an example of a first wireless base station, is a wireless base station (a core node) that is capable of providing a comparatively great cell radius, and performs wireless communication with wireless communication equipment or a mobile body apparatus (for example, vehicle 1) within a macro-cell. Furthermore, macro-cell base station CND1 is connected, by wired circuit L1 such as an optical line, to communication apparatus CT1, and is also connected to core network CNW through communication apparatus CT1.

Core network CNW, for example, is established as a network that makes possible high-speed data communication such as an optical line that uses an optical fiber.

In the following description, the macro-cell is defined as referring to a communication zone (a cell) that is capable of accommodating the single hop communication from vehicle 1.

Furthermore, vehicle 1 is connected to remote cockpit RCP in a manner that the data communication with remote cock RCP is possible, at least through small cell base station CND2, communication apparatus CT1, core network CNW, and communication apparatus CT2. In other words, remote cockpit RCP is connected to vehicle 1 in a manner that the data communication with vehicle 1 is possible, at least through communication apparatus CT2, core network CNW, communication apparatus CT1, and small cell base station CND2.

Small cell base station CND2 is a wireless base station (a core node) that is capable of providing a small cell which has a comparatively smaller cell radius than the macro-cell, and performs the wireless communication with a wireless communication apparatus or a mobile body apparatus (for example, vehicle 1) within this small cell. Furthermore, in the same manner as macro-cell base station CND1, small cell base station CND2 is connected, by wired circuit L2 such as an optical line, to communication apparatus CT1, and is also connected to core network CNW through communication apparatus CT1. In remote-type autonomous traveling system 100, multiple small cell base stations CND2 are provided.

Furthermore, vehicle 1 is connected to small cell base station ND1 in a manner that the data communication with small cell base station ND1 is possible. In the same manner as small cell base station CND2, small cell base station ND1, as an example of a second wireless base station, is a wireless base station (a node) that is capable of providing a small cell which has a comparatively small cell radius than the macro-cell, and performs the wireless communication within a wireless communication apparatus or a mobile body apparatus (for example, vehicle 1) within this small cell. Furthermore, small cell base station ND1 is connected to small cell base station CND2 in a manner that the data communication with small cell base station CND2 is possible, and performs the data communication with small cell base station CND2 using a first communication scheme (for example, a single hop communication) or a second communication scheme (for example, the multi-hop communication). In remote-type autonomous traveling system 100, multiple small cell base stations ND1 are provided. More precisely, vehicle 1 is connected to remote cockpit RCP in a manner that the data communication with remote cockpit RCP is possible, through small cell base station ND1, small cell base station CND2, communication apparatus CT1, core network CNW, and communication apparatus CT2. A type of communication that uses a connection from vehicle 1 to small cell base station CND2 through small cell base station ND1 is referred to as the multi-hop communication.

Remote cockpit RCP receives various pieces of data (for example, sensor-detected data that will be described below and the camera-captured image data) that are transmitted from vehicle 1, and for example, is configured with a server computer. Remote cockpit RCP may be configured with a normal personal computer instead of the server computer. Remote cockpit RCP generates a control signal for remotely causing vehicle 1 to travel autonomously, according to various pieces of data that are transmitted from vehicle 1, and transmits this control signal to vehicle 1 through communication apparatus CT2, core network CNW and macro-cell base station CND1 or small cell base station CND2.

For example, remote cockpit RCP includes a steering wheel sensor, an accelerator sensor, and a brake sensor, and acquires pieces of data that are detected by the steering wheel sensor, the accelerator sensor, and the brake sensor. In a case where vehicle 1 is caused to travel autonomously, remote cockpit RCP computes an optimal amount of steering wheel control, an optimal amount of accelerator control, and an optimal amount of brake control according to various pieces of data that are transmitted from vehicle 1 or pieces of data that are detected by the steering wheel sensor, the accelerator sensor, and the brake sensor. Remote cockpit RCP transmits a control signal that includes the amount of steering wheel control, the amount of accelerator control, and the amount of brake control to vehicle 1.

Furthermore, remote cockpit RCP may have a display. For example, the display is configured with a display for front view, a display for view the inside of the vehicle, and a display for rear view, and displays an image data generated by an individual vehicle-mounted camera, which is transmitted from vehicle 1. With an image that is displayed on the display, a remote operator of the remote cockpit RCP can know, specifically and visually, a state that appears when vehicle 1 in a remote location travels. In the same manner as a driver's seat of the actual vehicle 1, a seat on which the remote operator sits is equipped with a steering wheel, an accelerator pedal, and a brake pedal. With the steering wheel sensor, the accelerator pedal, and the brake pedal, it is possible that an amount of operation of each of these is detected.

The single hop communication and the multi-hop communication that are performed in remote-type autonomous traveling system 100 according to the present embodiment are briefly described here. The single hop communication and the multi-hop communication are conceptually in contrast with each other. The single hop (more precisely, one hop) communication refers to communication for transferring data on a per-hop basis (more precisely, relaying one-time data transfer or the like), between the terminal (for example, vehicle 1) that performs the wireless communication and the macro-cell base station or the small cell base station (the core node). On the other hand, the multi-hop communication refers to communication for transmitting data on the basis of multiple hops (more precisely, relaying multiple-times data transfer or the like) between the terminal (for example, vehicle 1) that performs the wireless communication and the small cell base station or the small cell base station (the core node).

Next, a hardware configuration of vehicle 1 is described in detail with reference to FIG. 2.

Figure 2:
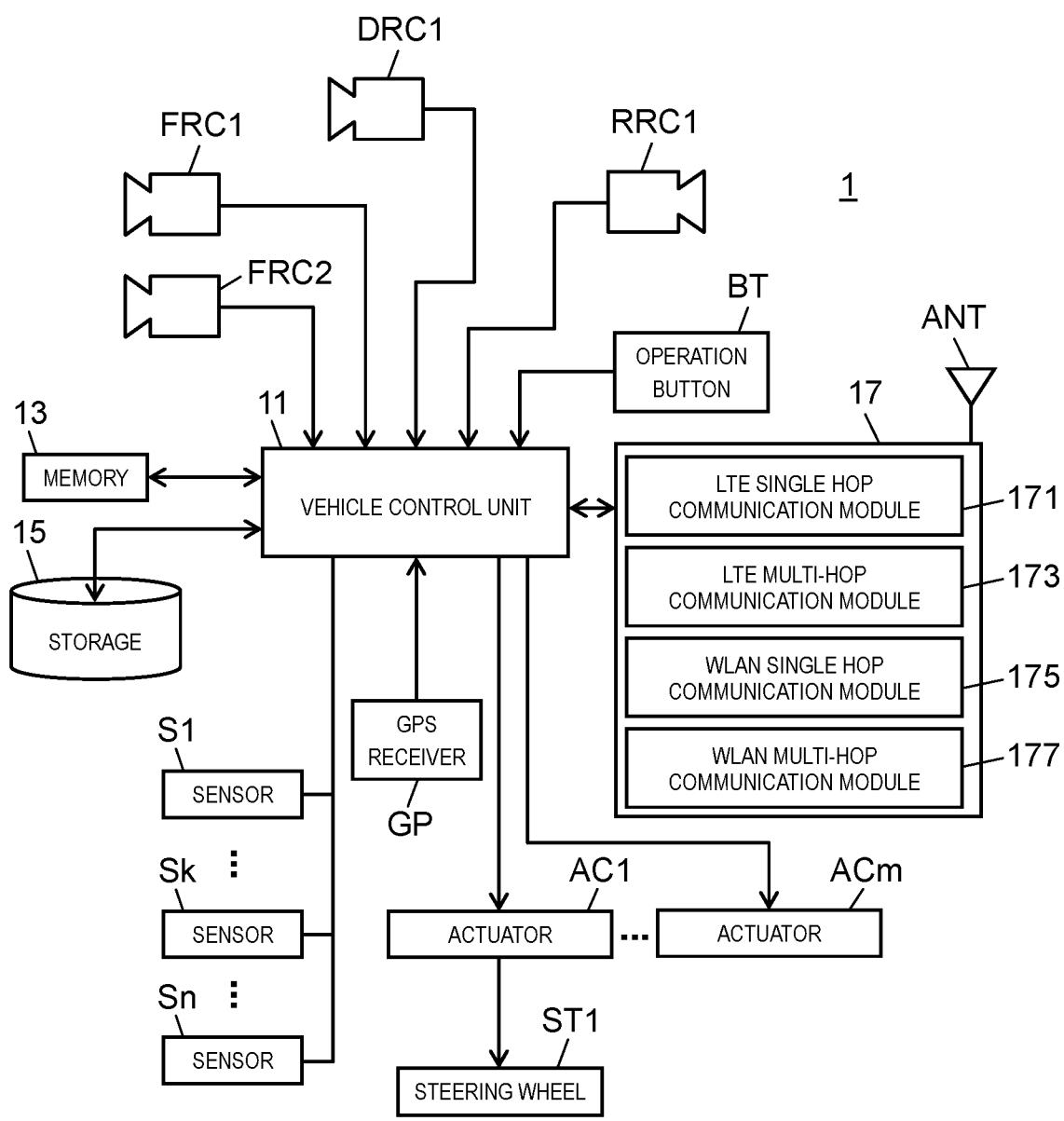
FIG. 2 is a block diagram illustrating in detail an example of a hardware configuration of a vehicle according to the present embodiment.

FIG. 2 is a block diagram illustrating in detail an example of a hardware configuration of vehicle 1 according to the present embodiment.

Vehicle 1 is configured to include vehicle-mounted cameras (for example, vehicle-mounted cameras FRC1, FRC2, DRC1, and RRC1), operation button BT, vehicle control unit 11, memory 13, storage 15, communication unit 17, GPS receiver GP, n (n and k are integers that are equal to or greater than 2, and 1≤k≤n) sensors, sensors S1, . . . , Sk, . . . Sn, steering wheel ST1, and m (m is an integer that is equal to or greater than 2) actuators, actuators AC1, . . . , ACm.

Each of vehicle-mounted cameras FRC1 and FRC2, as examples of the camera, captures an image of what appears in front of vehicle 1, and outputs data of the captured image to vehicle control unit 11. Vehicle-mounted cameras FRC1 and FRC2, for example, are arranged in the vicinity of a windshield of vehicle 1.

Vehicle-mounted camera DRC1, as an example of the camera, captures an image of what appears in front of the vehicle 1, when viewed from the driver's seat of vehicle 1, and outputs data of the captured image to vehicle control unit 11. Vehicle-mounted camera DRC1, for example, is installed in the vicinity of the headrest side of the driver's seat of vehicle 1.

Vehicle-mounted camera RRC1, as an example of the camera, captures an image of what appears in rear of vehicle 1, when viewed from the driver's seat of vehicle 1, and outputs data of the captured image to vehicle control unit 11. Vehicle-mounted camera RRC1, for example, is installed in the vicinity of the headrest side of the driver's seat of vehicle 1.

In a case where a driver gets in vehicle 1 that is remotely caused to travel autonomously, operation button BT is a button that is pushed down by the driver. With the operation by the driver who gets in vehicle 1, for example, operation button BT outputs an instruction to input a command to start, continue, or end driving for autonomous traveling (which, in some cases, is also referred to as "remote driving") under the control of remote cockpit RCP, to vehicle control unit 11.

Vehicle control unit 11, for example, is configured with an Engine Control Unit (ECU), functions as a control unit of vehicle 1, and for example, performs control processing for generally controlling operation of each of the units of vehicle 1, processing that inputs and outputs data into and from each of the units of vehicle 1, processing that computes (calculates) data, and processing that stores data. Vehicle control unit 11 operates according to a program and data that are stored in memory 13. The program and the data are ones that define operation of vehicle 1 as an example of the mobile body apparatus according to the present disclosure.

For example, vehicle control unit 11 acquires various pieces of sensor-detected data from sensors S1 to Sn, or various pieces of camera-captured image data from vehicle-mounted cameras FRC1, FRC2, DRC1, and RRC1. For example, vehicle control unit 11 acquires a control signal that is transmitted from the remote cockpit RCP (a control signal for the remote driving of vehicle 1, which is received by communication unit 17), and, based on this control signal, drives various actuators, actuators AC1 to ACm and thus controls the autonomous traveling at the time of the remote driving of vehicle 1. An example of a specific hardware configuration of vehicle control unit 11 will be described below with reference to FIG. 3.

Memory 13, for example, is configured with a Random Access Memory (RAM) and a Read Only Memory (ROM). The program and the data that define the operation of vehicle 1 as an example of the mobile body apparatus according to the present disclosure are stored in the ROM. Furthermore, memory 13 is used as a memory (RAM) for working when performing various processing operations, such as an arithmetic operation, in vehicle control unit 11.

Storage 15, for example, is configured with a Hard Disk Driver (HDD) or a Solid State Drive (SSD), and is a device for storing various pieces of data in vehicle 1. For example, stored in storage 15 are various pieces of sensor-detected data from sensor S1 to Sn, or various pieces of camera-captured image data from vehicle-mounted cameras FRC1, FRC2, DRC1, and RRC1. Furthermore, stored in storage 15 is history information on a past accident (for example, a traffic accident) or a spot where an event occurred in the past (for example, information on a location where the accident or the event occurred).

Communication unit 17 has LTE single hop communication module 171, LTE multi-hop communication module 173, WLAN single hop communication module 175, and WLAN multi-hop communication module 177. Communication unit 17 performs the data communication with remote cockpit RCP using any one of the communication modules and antenna ANT.

LTE single hop communication module 171 is a communication module for performing the data communication with the macro-cell base station that is capable of providing a macro-cell in compliance with cellular-based wireless standards (for example, LTE), using the first communication scheme (for example, the single hop communication).

LTE multi-hop communication module 173 is a communication module for performing the data communication with a small cell base station that is capable of providing a small cell in compliance with the cellular-based wireless standards (for example, LTE), using the second communication scheme (for example, the multi-hop communication).

WLAN single hop communication module 175 is a communication module for performing the data communication with the macro-cell base station that is capable of providing a macro-cell in compliance with non-cellular-based wireless standards (for example, wireless LANs (WLANs) such as Wifi (a registered trademark)), using the first communication scheme (for example, the single hop communication). It is preferable that, for example, frequencies available for a wireless LAN are in a 4.9 GHz band that are stipulated Institute of Electrical and Electronics Engineers (IEEE) 802.11j are used in Japan.

WLAN multi-hop communication module 177 is a communication module for performing the data communication with the small cell base station that is capable of providing a small cell in compliance with non-cellular-based wireless standards (for example, wireless LANs (WLANs) such as Wifi (a registered trademark)), using the second communication scheme (for example, the multi-hop communication).

In FIG. 2, it is illustrated that only single antenna ANT is provided in vehicle 1, but multiple antenna ANT may be provided in communication unit 17. Communication unit 17 may switch between the antennas ANT that are used, according to the module that is used for communication. For example, communication unit 17 uses a first antenna when performing LTE single hop communication 171, a second antenna when performing LTE multi-hop communication module 173, a third antenna when performing WLAN single hop communication module 175, and a fourth antenna when performing WLAN multi-hop communication module 177.

Global Positioning System (GPS) receiver GP receives multiple signals that indicate time and a position (coordinates) of each of the GPS satellites, which are transmitted from multiple navigation satellites (more precisely, the GPS satellites). The GPS receiver GP, as an example of an acquisition unit, calculates and acquires the positions (more precisely, a position of vehicle 1) of the GPS receivers GP based on the multiple signals that are received. The GPS receiver GP may be provided within vehicle control unit 11. The GPS receiver GP outputs information on the position of vehicle 1, which is obtained by the calculation, to vehicle control unit 11. The calculation of the information on the position by the GPS receiver GP may be performed by vehicle control unit 11 instead of the GPS receiver GP. In this case, input into vehicle control unit 11 are the pieces of information that indicate the time and the position of each of the GPS satellite, which are included in the multiple signals that are received by the GPS receiver GP.

Sensor Sk (k is an integer from 1 to n and n is an integer that is equal to or greater than 2), as an example of the acquisition unit, detects and acquires pieces of environmental information (which, in other words, are information on vehicle 1 itself and information relating to the vicinity of vehicle 1) (the same is hereinafter true), respectively, that are used to specify a traveling state of vehicle 1. Sensor Sk outputs data that is detected (hereinafter referred as to "sensor-detected data") to vehicle control unit 11. Sensor Sk detects a speed of vehicle 1 (more precisely, a wheel speed), as an example of the sensor-detected data. Furthermore, sensor Sk may be configured with an existing vehicle-mounted radar. Sensor Sk detects a distance to any other vehicle or a distance to an obstacle that is present on public road PH, as an example of the sensor-detected data.

Steering wheel ST1 adjusts a steering angle of vehicle wheels (for example, front left and right wheels) when vehicle 1 travels. In a conventional-type normal driving method in which the driver (a so-called operator) gets in vehicle 1 and drives vehicle 1, the driver turns steering wheel ST1 in such a manner as to make a desired steering angle. On the other hand, in remote-type autonomous traveling system 100 according to the present embodiment, regardless of whether or not the driver (a so-called operator) gets in vehicle 1, actuator AC1 that is based on a control signal from vehicle control unit 11 is driven, and thus a rotation angle of steering wheel ST1 is controlled. The rotation angle of steering wheel ST1, for example, is included in a control signal for the remotely-operated autonomous traveling of vehicle 1, which is transmitted from remote cockpit RCP.

Actuators AC1 to ACm control driving of each of the components (for example, steering wheel ST1, an engine, and a brake) within vehicle 1 for performing the remotely-operated autonomous traveling of vehicle 1, based on the control signal from vehicle control unit 11. For example, actuator AC1 adjusts an angle of the wheels (for example, front left and right wheels) of vehicle 1 by controlling the rotation angle of steering wheel ST1. Furthermore, another actuator adjusts the number of revolutions per minute of the engine by controlling an engine throttle valve. Furthermore, another actuator adjusts a braking force of vehicle 1 by hydraulic control of the brake. Furthermore, another actuator (for example, actuator ACm) adjusts switches between turning on and turning off a tail lamp.

Figure 3:
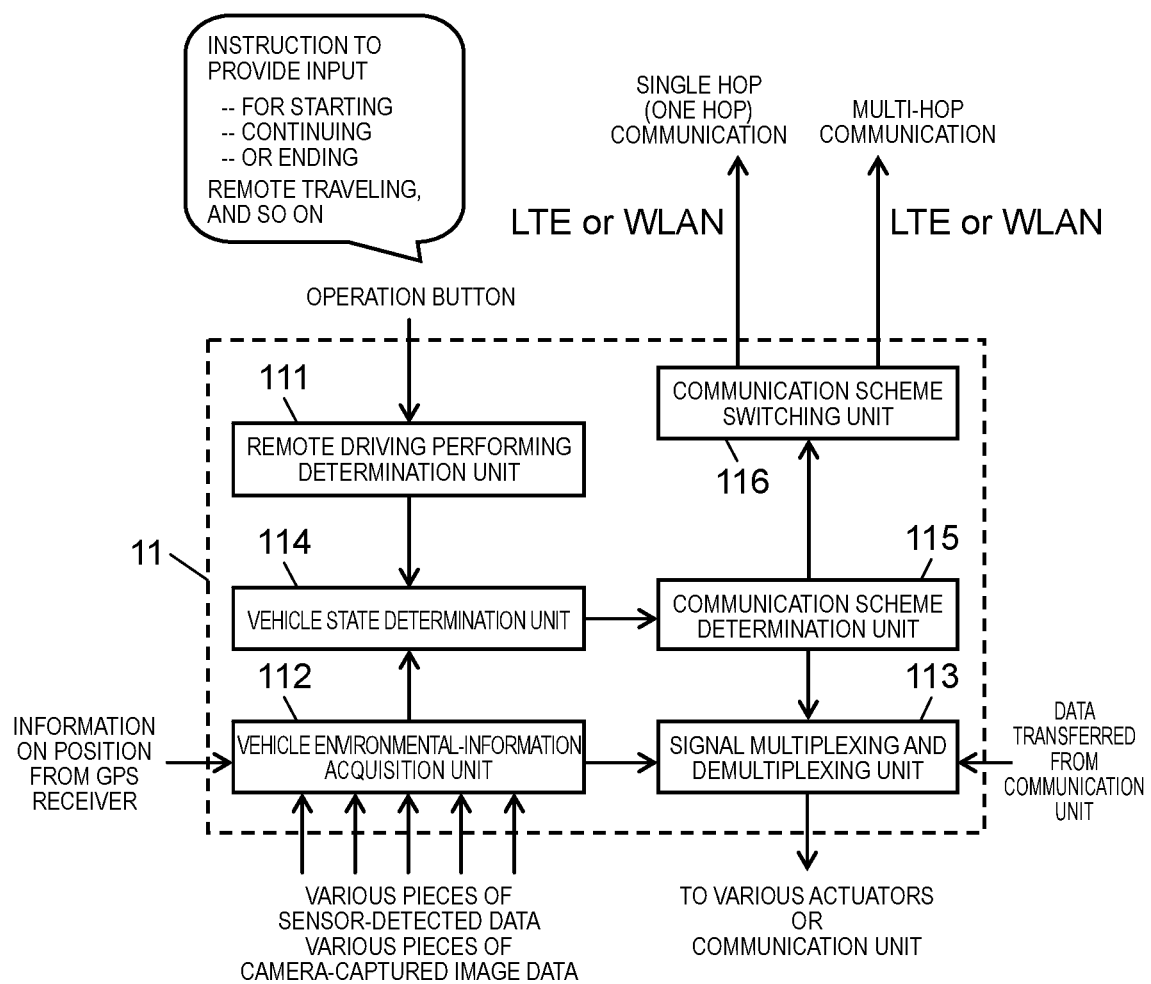
FIG. 3 is a block diagram illustrating in detail an example of a software configuration of a vehicle control unit according to the present embodiment.

FIG. 3 is a block diagram illustrating in detail an example of a software configuration of vehicle control unit 11 according to the present embodiment.

Vehicle control unit 11 is configured to include remote driving performing determination unit 111, vehicle environmental-information acquisition unit 112, signal multiplexing and demultiplexing unit 113, vehicle state determination unit 114, communication scheme determination unit 115, and communication scheme switching unit 116. Each of remote driving performing determination unit 111, vehicle environmental-information acquisition unit 112, signal multiplexing and demultiplexing unit 113, vehicle state determination unit 114, communication scheme determination unit 115, and communication scheme switching unit 116 is configured with a Central Processing Unit (CPU), a Micro Processing Unit (MPU), or a Digital Signal Processor (DSP), each of which is mounted as a component of the ECU.

For example, with operation of operation button BT by the driver who gets in vehicle 1, remote driving performing determination unit 111, for example, receives the instruction to input a command to start, continue, or end the remotely-operated autonomous traveling (remote driving) of vehicle 1, and outputs a result of processing the inputting instruction to vehicle state determination unit 114.

Vehicle environmental-information acquisition unit 112, as an example of the acquisition unit, acquires environmental information on vehicle 1. The environmental information on vehicle 1, for example, includes at least one of the sensor-detected data that is detected by each sensor Sk, the data of the camera image that is captured by each of vehicle-mounted cameras FRC1, FRC2, DRC1, and RRC1, and the information on the position of vehicle 1 that is computed by GPS receiver GP. Vehicle environmental-information acquisition unit 112 output the environmental information on vehicle 1 to signal multiplexing and demultiplexing unit 113 and vehicle state determination unit 114.

Signal multiplexing and demultiplexing unit 113 multiplexes the environmental information on vehicle 1 from vehicle environmental-information acquisition unit 112 (for example, codes the camera-captured image data) and outputs the multiplexed environment information to communication unit 17. Furthermore, signal multiplexing and demultiplexing unit 113 demultiplexes (for example, decodes) data (for example, a control signal that is transmitted from remote cockpit RCP) that is transferred from communication unit 17, and outputs the decoded transferred data to various actuators that need the transfer data according to the demultiplexing processing result.

Vehicle state determination unit 114, as an example of a determination unit, always or periodically determines whether or not vehicle 1 is in a critical state while remotely-operated autonomous traveling is in progress (more precisely, while the remote driving is in progress), based on the environmental information on vehicle 1 and an output from remote driving performing determination unit 111. Vehicle state determination unit 114 outputs a result of the determination to communication scheme determination unit 115. The critical state is equivalent to at least one of a state where there is a high likelihood that vehicle 1 will encounter an incident (for example, an accident or an event) (the same is hereinafter true), a state where vehicle 1 will encounter an incident soon, a state where the driver who gets in vehicle 1 has to exercise care, and a state of emergency.

Therefore, the critical state can be said to be a state where there is a likelihood that an entity in remote cockpit RCP that provides an instruction for the remote driving of vehicle 1 (for example, a person, such as a driver, a robot that is equivalent to the driver, or the like) (the same is hereinafter true) will perform a remote operation of requesting low delay in image transfer for avoidance of a collision with any other vehicle or the like, based on the camera-captured image data that is transmitted from vehicle 1.

On the other hand, a state that is not critical (a non-critical state) can be said to be a state where there is a likelihood that the entity in remote cockpit RCP that provides the instruction for the remote driving of vehicle 1 will perform a remote operation of not requesting low delay for taking action when vehicle 1 develops trouble (for example, when an engine stops outside of a shoulder), but there is necessarily no need to perform a remote operation of requesting low delay.

In a case where vehicle 1 is not in the critical state, vehicle 1 is said to be in the non-critical state.

Several cases where vehicle state determination unit 114 that vehicle 1 is in the critical state are described here.

For example, for checking, vehicle state determination unit 114 compares the information on the position of vehicle 1 from GPS receiver GP and the history information that is read from storage 15. In a case where it is determined that vehicle 1 is going to pass or approach a spot where the accident or the event that is registered in the history information occurred in the past (for example, an intersection), vehicle state determination unit 114 determines that vehicle 1 is in the critical state.

Furthermore, for example, in a case where it is determined that the speed of vehicle 1 (more precisely, the wheel speed), as an example of the sensor-detected data, exceeds a first prescribed value that is predetermined, vehicle state determination unit 114 determines that vehicle 1 is in the critical state.

Furthermore, for example, in a case where it is determined that a distance between vehicle 1 and any other vehicle, as an example of sensor-detected data, is at or below a second prescribed value that is predetermined, vehicle state determination unit 114 determines that vehicle 1 is in the critical state.

Furthermore, for example, in a case where it is determined that a distance from vehicle 1 to any other obstacle, as an example of the sensor-detected data, is at or below a third prescribed value that is predetermined, vehicle state determination unit 114 determines that vehicle 1 is in the critical state.

Communication scheme determination unit 115 determines a wireless communication scheme that is used by vehicle 1, based on a result of the determination by vehicle state determination unit 114, and outputs a result of its determination to communication scheme switching unit 116.

For example, in a case where it is possible that vehicle 1 uses only a communication network for cellular-based wireless standards (for example, LTE), according to the result of the determination that vehicle 1 is in the critical state, communication scheme determination unit 115 determines that communication with the macro-cell base station that is capable of providing a macro-cell in compliance with cellular-based wireless standards (for example, LTE) is performed using the first communication scheme (for example, the single hop communication).

For example, in a case where it is possible that vehicle 1 uses both a communication network in compliance with cellular-based wireless standards (for example, LTE) and a communication network in compliance with non-cellular-based wireless standards (for example, a wireless LAN such as Wifi (a registered trademark)), according to the result of the determination that vehicle 1 is in the critical state, communication scheme determination unit 115 determines that, as is the case with data off-load, the communication with the macro-cell base station that is capable of preferentially providing a macro-cell in compliance with non-cellular-based wireless standards (for example, a wireless LAN such as Wifi (a registered trademark)) is performed using the first communication scheme (for example, the single hop communication).

For example, in a case where it is possible that vehicle 1 uses only the communication network for cellular-based wireless standards (for example, LTE), according to the result of the determination that vehicle 1 is in the critical state, communication scheme determination unit 115 determines that communication with the small cell base station that is capable of providing a small cell in compliance with cellular-based wireless standards (for example, LTE) is performed using the second communication scheme (for example, the multi-hop communication).

For example, in a case where it is possible that vehicle 1 uses both the communication network in compliance with cellular-based wireless standards (for example, LTE) and the communication network in compliance with non-cellular-based wireless standards (for example, a wireless LAN such as Wifi (a registered trademark), according to the result of the determination that vehicle 1 is in the non-critical state, communication scheme determination unit 115 determines that, as is the case with the data off-load, the communication with the small cell base station that is capable of preferentially providing a small cell in compliance with non-cellular-based wireless standards (for example, a wireless LAN such as Wifi (a registered trademark)) is performed using the second communication scheme (for example, the multi-hop communication).

According to the result of the determination from communication scheme determination unit 115, communication scheme switching unit 116 switches between wireless communication schemes that are used by vehicle 1. Specifically, communication scheme switching unit 116 performs switching to a communication scheme that uses the single hop communication, between communication scheme switching unit 116 and the macro-cell base station that is capable of providing the macro-cell in compliance with cellular-based wireless standards (for example, LTE). Communication scheme switching unit 116 performs switching to the communication scheme that uses the single hop communication, between communication scheme switching unit 116 and the macro-cell base station that is capable of providing the macro-cell in compliance with non-cellular-based wireless standards (for example, a wireless LAN). Communication scheme switching unit 116 performs switching to the communication scheme that uses the single hop communication, between communication scheme switching unit 116 and the small base station that is capable of providing the small cell in compliance with cellular-based wireless standards (for example, LTE). Communication scheme switching unit 116 performs switching to the communication scheme that uses the single hop communication, between communication scheme switching unit 116 and the small cell base station that is capable of providing the small cell in compliance with non-cellular-based wireless standards (for example, a wireless LAN).

<Outline of Operation of Remote-Type Autonomous Traveling System>

Next, remote-type autonomous traveling system 100 according to the present embodiment is described with reference to FIGS. 4 and 5.

Figure 4:
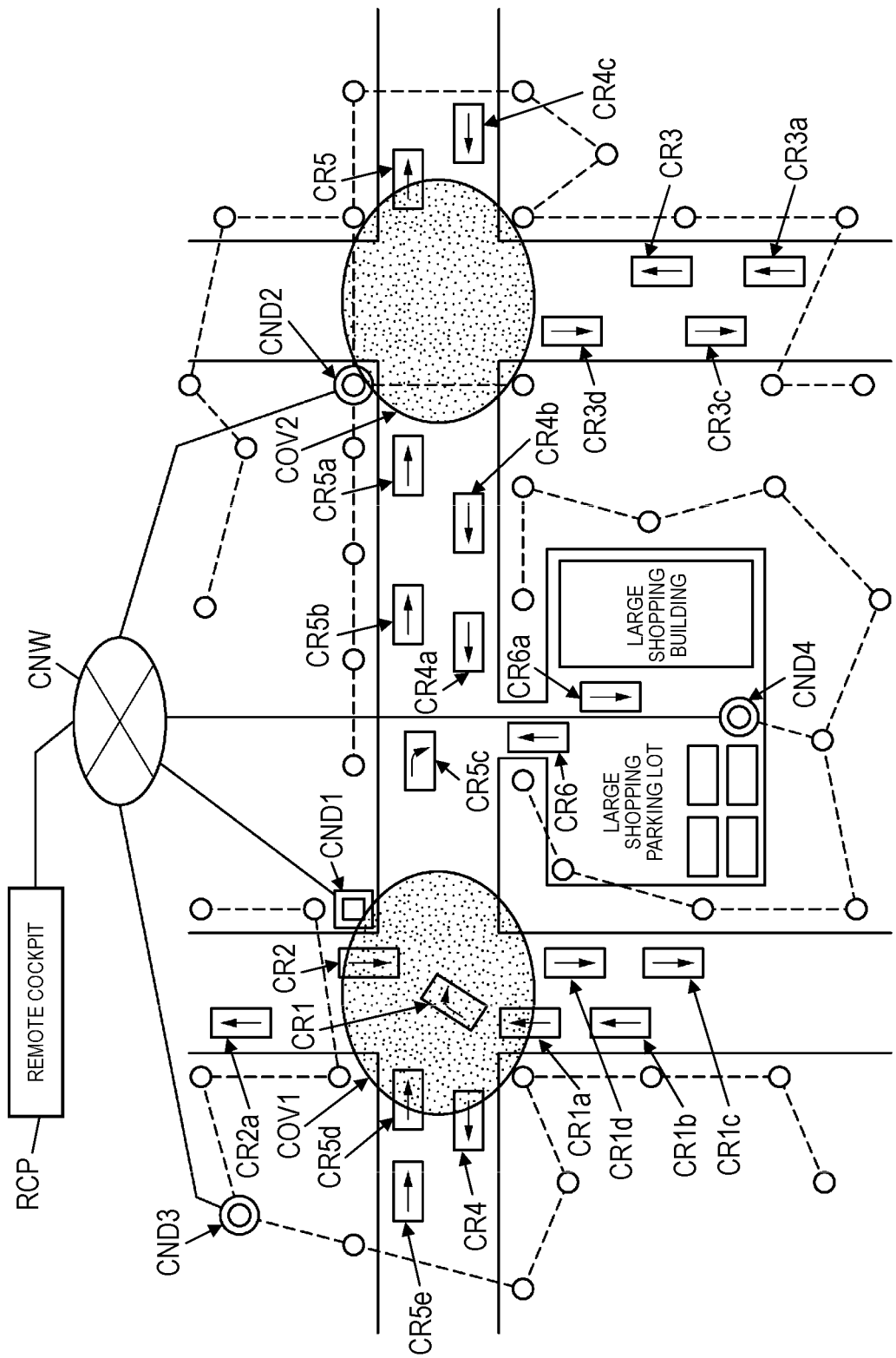
FIG. 4 is a diagram illustrating an example of a case of the use of the remote-type autonomous traveling system according to the present embodiment.

FIG. 4 is a diagram illustrating an example of a case of use of remote-type autonomous traveling system 100 according to the present embodiment. FIG. 5 is a descriptive diagram illustrating an example of communication of pieces of data of images that are captured by cameras which are installed within vehicles CR1, CR2, and CR3 in FIG. 4, respectively. It is assumed that one or several of, or all of the vehicles (for example, vehicles CR1, CR2, and CR3 that are described with reference to FIG. 5) that are illustrated in FIGS. 4 and 5 have the same configuration as vehicle 1 that is described above with reference with FIGS. 2 and 3, and are performing the remotely-operated autonomous traveling (the remote driving).

In FIG. 4, for example, a situation is illustrated where multiple vehicles (specifically, vehicles CR4, CR1, CR4a, CR4b, CR4c, CR5, CR5a, CR5b, CR5c, CR5d, and CR5e) travel on a trunk road (an example of public road PH that is illustrated in FIG. 1) that faces a site that accommodates a large shopping building and a large shopping parking lot (refer to the center of the sheet on which FIG. 4 is drawn) on a downtown street. In the following description, it is assumed that a wireless LAN network in compliance with non-cellular-based wireless standards are provided within the site described above, in a manner that wireless LAN communication such as Wifi (a registered trademark) is possible.

Furthermore, a situation is illustrated where multiple vehicles (specifically, vehicles CR2, CR2a, CR1a, CR1b, CR1c, and CR1d, and vehicles CR3, CR3a, CR3c, and CR3d) travel on two types of side roads (an example of public road PH that is illustrated in FIG. 1), respectively, that orthogonally intersect the trunk road. Vehicle CR6 and CR6a travel on the site that accommodates the large shopping building and the large shopping parking lot (refer to the center of the sheet on which FIG. 4 is drawn), which are described above.

Macro-cell base station CND1 that is capable of providing a macro-cell that has a comparatively large cell radius in compliance with cellular-based wireless standards such as LTE is installed in the vicinity of intersection COV1 on the side road on the left side of the sheet on which FIG. 4 is drawn, of the two types of side roads described above. Macro-cell base station CND1 is connected to core network CNW through wired communication such as an optical line and is connected to remote cockpit RCP through core network CNW. As described above with reference to FIG. 1, communication apparatus CT1 and CT2 are relays that are connected to core network CNW. Furthermore, macro-cell base station CND1 is described as providing, for example, the macro-cell that has a comparatively large cell radius in compliance with the cellular-based wireless standards such as LTE, but, for example, a macro-cell that has a comparatively large cell radius in compliance with non-cellular-based wireless standards such as a wireless LAN may be provided.

Furthermore, small cell base station CND2 that is capable of providing a small cell that has a comparatively small cell radius in compliance with the cellular-based wireless standards such as LTE is installed in the vicinity of intersection COV2 on the side road on the right side of the sheet on which FIG. 4 is drawn, of the two types of side roads described above. Small cell base station CND2 is connected to core network CNW through wired communication such as an optical line and is connected to remote cockpit RCP through core network CNW.

Furthermore, small cell base station CND3 that is capable of providing a small cell that has a comparatively small cell radius in compliance with the cellular-based wireless standards such as LTE is installed in a spot that is at a short distance away from intersection COV1. Small cell base station CND3 is connected to core network CNW through wired communication such as an optical line and is connected to remote cockpit RCP through core network CNW.

Furthermore, for example, small cell base station CND4 that is capable of providing a comparatively small cell radius in compliance with the non-cellular-based wireless standards such as a wireless LAN is installed in a spot within the site that accommodates the large shopping building and the large shopping parking lot in FIG. 4. Small cell base station CND4 is connected to core network CNW through wired communication such as an optical line and is connected to remote cockpit RCP through core network CNW.

Figure 5:
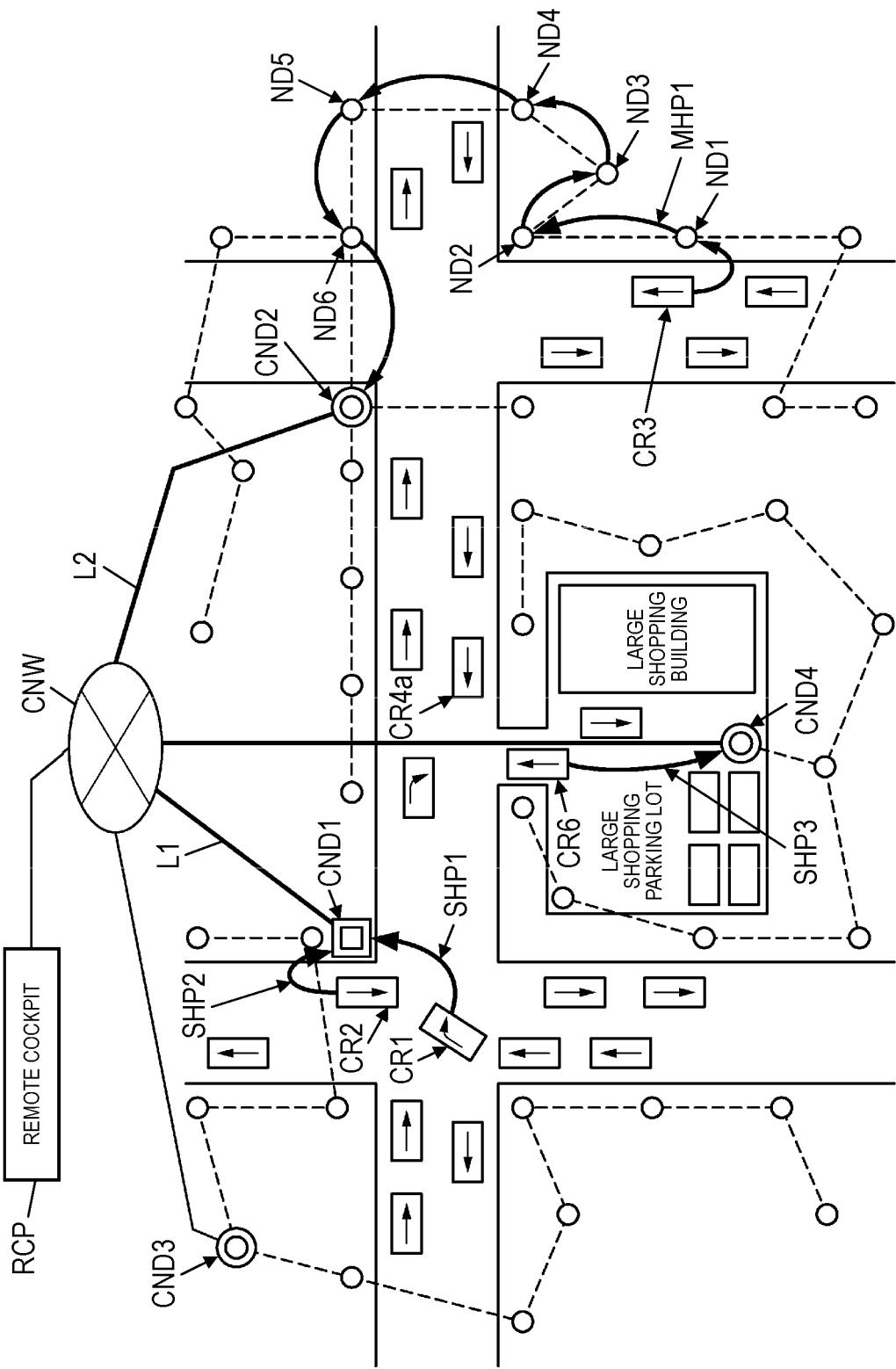
FIG. 5 is a descriptive diagram illustrating an example of communication of pieces of data of images that are captured by cameras which are installed within vehicles CR1, CR2, and CR3 in FIG. 4, respectively.

As illustrated in FIG. 5, a state is assumed where, when vehicle CR1 is about to turn light, vehicle CR1 is in a state of almost colliding with vehicle CR2 that is traveling on the opposite traffic lane. With a vehicle-mounted radar, as an example of sensor Sk, vehicle CR1 determines that a distance to any other vehicle (vehicle CR2) is at or below the second given value and thus determines that the assumed state described above is the critical state. Furthermore, in a case where it is determined that information that intersection COV1 is a spot where an accident (for example, an accident in which vehicles collide with each other, or an accident in which a contact occurs between a vehicle and a person) occurred is registered in the history information within storage 15, vehicle CR1 may determine that the critical state is retained regardless of whether vehicle CR2 is present or absent.

In this case, vehicle CR1 performs single hop communication SHP1 between vehicle CR1 and macro-cell base station CND1 that is capable of providing a macro-cell in compliance with cellular-based wireless standards (for example, LTE), and, for example, transmits various pieces of data of camera images that are captured by the vehicle-mounted cameras within vehicle CR1, or various pieces of sensor-detected data to macro-cell base station CND1. The various pieces of data of the camera images or the pieces of sensor-detected data that are obtained in vehicle CR1 are transmitted to remote cockpit RCP through wired circuit L1 such as an optical line and core network CNW. In other words, while the various pieces of data of the camera images or the pieces of sensor-detected data that are obtained from vehicle CR1 are transmitted by vehicle CR1 and are received in remote cockpit RCP, only a single hop (one hop) for wireless communication is present in a macro-cell section of macro-cell base station CND1, and thus, it is ensured that data is reached after a short delay time.

Furthermore, with the vehicle-mounted radar, as an example of sensor Sk, when vehicle CR2 is about to travel forward, vehicle CR2 determines that a distance to vehicle CR1 on the opposite traffic lane that turns right is at or below the second given value, and thus determines that a state where a collision with vehicle CR1 is likely to occur is the critical state. In the same manner, in the case where it is determined that information that intersection COV1 is a spot where an accident (for example, an accident in which vehicles collide with each other, or an accident in which a contact occurs between a vehicle and a person) occurred is registered in the history information within storage 15, vehicle CR2 may determine that the critical state is retained regardless of whether vehicle CR1 is present or absent.

In this case, vehicle CR2 performs single hop communication SHP2 between vehicle CR2 and macro-cell base station CND1 that is capable of providing a macro-cell in compliance with cellular-based wireless standards (for example, LTE), and, for example, transmits various pieces of data of camera images that are captured by the vehicle-mounted cameras within vehicle CR2, or various pieces of sensor-detected data to macro-cell base station CND1. The various pieces of data of the camera images or the pieces of sensor-detected data that are obtained in vehicle CR2 are transmitted to remote cockpit RCP through wired circuit L1 such as an optical line and core network CNW. In other words, while the various pieces of data of the camera images or the pieces of sensor-detected data that are obtained from vehicle CR2 are transmitted by vehicle CR2 and are received in remote cockpit RCP, only a single hop (one hop) for wireless communication is present in a macro-cell section of macro-cell base station CND1, and thus, it is ensured that data is reached after a short delay time.

Furthermore, with a speed sensor, as an example of sensor Sk, when vehicle CR3 is to travel forward, vehicle CR3 determines that a speed (more precisely, a wheel speed) of vehicle CR3 is at or below the first given value, and thus determines that a state of vehicle CR3 is the non-critical state. In the same manner, in a case where it is determined that a result of comparison with the history information within storage 15 is that a position of vehicle CR3 is not consistent with a spot where an accident (for example, an accident in which vehicles collide with each other, or an accident in which a contact occurs between a vehicle and a person) occurred, vehicle CR3 may determine that the non-critical state is retained.

In this case, in order to perform the multi-hop communication in which remote cockpit RCP is set to be a final destination, vehicle CR3 transmits, for example, various pieces of camera-captured image data or various pieces of sensor-detected data, which are captured by the vehicle-mounted cameras within vehicle CR3, to small cell base station ND1, with small cell base station ND1 being capable of providing a small cell in compliance with cellular-based wireless standards (for example, LTE) being set to be a primary destination. The various pieces of data of the camera images or the pieces of sensor-detected data that are obtained in vehicle CR3 are transmitted to remote cockpit RCP through small cell base stations ND1, ND2, ND3, ND4, ND5, and DN6, small cell base station CND2, wired circuit L2 such as an optical line, and core network CNW.

Furthermore, a state is assumed where, when vehicle CR6 gets out of the site where the large shopping parting lot is located, and is about to enter the trunk road, vehicle CR6 is likely to collide with vehicle CR4a that travels forward along the trunk road. With the vehicle-mounted radar, as an example of sensor Sk, vehicle CR6 determines that a distance to any other vehicle (vehicle CR4a) is at or below the second given value and thus determines that the assumed state described above is the critical state. Furthermore, in a case where it is determined that information that the vicinity of a connection spot between the large shopping parking lot and the trunk road is a spot where an accident (for example, an accident in which vehicles collide with each other, or an accident in which a contact occurs between a vehicle and a person) occurred is registered in the history information within storage 15, vehicle CR6 may determine that the critical state is retained regardless of whether vehicle CR4a is present or absent.

In this case, vehicle CR6 performs single hop communication SHP3 between vehicle CR6 and small cell base station CND4 that is capable of providing a small cell in compliance with non-cellular-based wireless standards (for example, a wireless LAN), and, for example, transmits various pieces of data of camera images that are captured by the vehicle-mounted cameras within vehicle CR6, or various pieces of sensor-detected data to small cell base station CND4. The various pieces of data of the camera images or the pieces of sensor-detected data that are obtained in vehicle CR6 are transmitted to remote cockpit RCP through wired circuit L3 such as an optical line and core network CNW.

Furthermore, when, in the non-critical state, a vehicle is connected to a small cell base station, in some cases, depending on a position of the vehicle, instead of a small cell base station that is not connected to core network CNW, such as small cell base station ND1, the vehicle makes a connection to a small cell base station that is connected to core network CNW, such as small cell base station CND2. In this case, instead of the multi-hop communication, a vehicle (for example, vehicle CR5a) may preferentially perform the single hop communication.

<Operation of Remote-Type Autonomous Traveling System>

First, remote-type autonomous traveling system 100 according to the present embodiment is described with reference to FIGS. 6 and 7.

Figure 6:
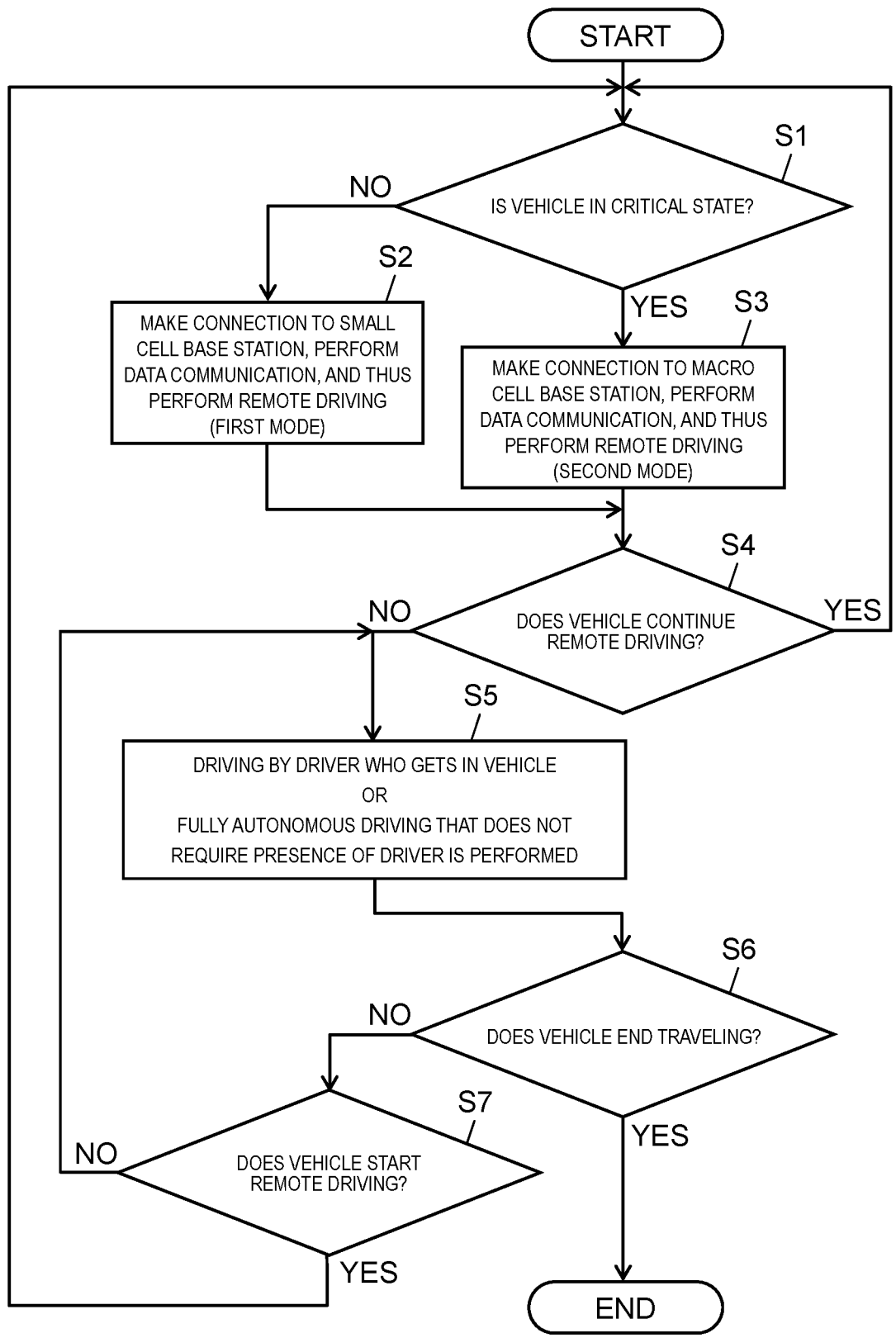
FIG. 6 is a flowchart for describing in detail an example of a procedure for operation of the remote-type autonomous traveling system according to the present embodiment.

FIG. 6 is a flowchart for describing in detail an example of a procedure for operation of remote-type autonomous traveling system 100 according to the present embodiment. FIG. 7 is a diagram illustrating a table showing an example of the use of remote-type autonomous traveling system 100 according to the present embodiment. Subject on the description with reference to FIG. 6, it is assumed that vehicle 1 is performing the remotely-operated autonomous traveling (more precisely, the remote driving) under the control of remote cockpit RCP.

In FIG. 6, vehicle CR1 determines whether or not vehicle CR1 itself is in the critical state (S1). According to a result of the determination that vehicle CR1 is not in the critical state (in other words, is in the non-critical state) (NO in S1), vehicle CR1 makes a connection to a small cell base station (for example, small cell base station ND1 in FIG. 5) and continues a first mode of performing the remote driving while performing the data communication (S2). On the other hand, according to a result of the determination that vehicle CR1 is in the critical state (YES in S1), vehicle CR1 makes a connection to a macro-cell base station (for example, macro-cell base station CND1 in FIG. 5) and continues a second mode for performing the remote driving while performing the data communication (S3).

At this point, in the first mode for performing the remote driving, the autonomous travelling is essentially performed by vehicle 1. However, the first mode is a driving mode in which, at a request of a system (for example, vehicle 1 or an entity remote cockpit RCP that provides an instruction for the remote driving of vehicle 1), the entity remote cockpit RCP that provides an instruction for the remote driving of vehicle 1 may perform any remote driving in a range where the remote driving is performed under the condition that the image transfer does not suffer a low delay. For example, the remote moving of vehicle 1 that came across an accident to a shoulder for stopping can be said to be an example of driving in the first mode for performing the remote driving.

Furthermore, in the second mode for performing the remote driving, the autonomous traveling is essentially performed by vehicle 1. However, the second mode is a driving mode in which, at a request of a system (for example, vehicle 1 or an entity remote cockpit RCP that provides an instruction for the remote driving of vehicle 1), the entity remote cockpit RCP that provides an instruction for the remote driving of vehicle 1 may perform any remote driving in a range where the remote driving is performed under the condition that the image transfer suffers a low delay. For example, the remote emergency stopping of vehicle 1 by the entity remote cockpit RCP that provides an instruction for the remote driving of vehicle 1 when a person appears suddenly in front of vehicle 1 can be said to be an example of driving in the second mode for performing the remote driving.

Subsequently to Step S2 or Step S3, for example, according to the operation of operation button BT by a driver (a so-called operator) who gets in vehicle 1, vehicle 1 determines whether or not to continue the remote driving (S4). Furthermore, according to a control signal that is based on the remote operation by the entity in remote cockpit RCP that provides an instruction for the remote driving of vehicle 1, vehicle 1 may determine whether or not to continue the remote driving. In a case where it is determined that the remote driving is continued (YES in S4), processing for vehicle 1 returns Step S1.

On the other hand, in a case where it is determined that the remote driving is not continued (NO in S4), vehicle 1 performs the driving by the driver that gets in vehicle 1 (more precisely, normal driving), or entirely autonomous driving that does not require the presence of the driver (S5). At this point, the configuration of vehicle 1 with reference to FIGS. 2 and 3 is described and thus the description is provided on the assumption that entirely autonomous driving that does not require the presence of the driver is possible.

Subsequently to Step S5, in a case where vehicle 1 ends the traveling (YES in S6), the description with reference to FIG. 6 is finished. On the other hand, subsequently to Step S5, in a case where vehicle 1 does not end the traveling (NO in S6), for example, according to the operation of operation button BT by a driver (a so-called operator) that gets in vehicle 1, vehicle 1 determines whether or not to start the remote driving (S7). Furthermore, according to a control signal that is based on the remote operation by the entity in remote cockpit RCP that provides an instruction for the remote driving of vehicle 1, vehicle 1 may determine whether or not to start the remote driving. In a case where it is determined that the remote driving is started (YES in S7), the processing for vehicle 1 returns to Step S1. On the other hand, in a case where it is determined that the remote driving is not started (NO in S7), the processing for vehicle 1 returns to Step S5.

Next, subject to the description with reference to FIG. 7, it is assumed that each of the data transfer speeds for various pieces of camera-captured image data that are uplink-distributed (more precisely, transmitted) from one vehicle, vehicle 1, is set to 3 Mbps and that four vehicle-mounted cameras are installed in one vehicle, vehicle 1. In this case, the data transfer speed for the camera-captured image data that is transmitted from one vehicle, vehicle 1 is set to 12 Mbps.

Furthermore, it is assumed that 50 vehicles 1 in the remote-type autonomous traveling system are present in a 100 m×100 m area (more precisely, 0.01 km² (square kilometer)). Thus, a data transfer speed for pieces of camera-captured image data that are transmitted from 50 vehicles 1 is 600 Mbps (=50×12 Mbps).

Furthermore, it is assumed that on actual public road (PH), vehicles in the critical state are tentatively set to account for 10% of all vehicles within the area of 0.01 km² described above and vehicles in the non-critical state are set to account for 90%.

Thus, a required capacity necessary for communication with vehicle 1 in the critical state is a data transfer speed of approximately 60 Mbps, although vehicle 1 makes a connection to a macro-cell base station that is capable of providing a macro-cell in compliance with cellular-based wireless standards (for example, LTE), and although vehicle 1 makes a connection to a macro-cell base station that is capable of providing a macro-cell in compliance with non-cellular-based wireless standards (for example, a wireless LAN). More precisely, because approximately 10% of a data transfer speed (600 Mbps) for all 50 vehicles is sufficient, an increase in a system capacity of the macro-cell (for example, an LTE macro-cell or a WLAN macro-cell) is avoidable. Therefore, a delay time for the camera-captured image data from vehicle 1 in the uplink distribution is easy to realize to the extent of approximately 10 ms.

Furthermore, a required capacity necessary for communication with vehicle 1 in the non-critical state is a data transfer speed of approximately 540 Mbps, although vehicle 1 makes a connection to a small cell base station that is capable of providing a small cell in compliance with cellular-based small standards (for example, LTE), and although vehicle 1 makes a connection to a small cell base station that is capable of providing a small cell in compliance with non-cellular-based wireless standards (for example, a wireless LAN). More precisely, the data transfer speed is a high numerical value that accounts for approximately 90% of the data transfer speed (600 Mbps) for all 50 vehicles, but in the first place, because a low delay for the camera-captured image data is not necessarily required in the non-critical state, for example, it is considered that there is a high likelihood that a delay time of approximately 200 ms to 1000 ms, although is 20 times longer than a delay time (approximately 10 ms) at the time of the single hop communication, will be allowed. Furthermore, with the multi-hop communication, each of vehicles 1 performs transmission to remote cockpit RCP through multiple small cell base stations. For this reason, it is possible that amounts of transferred data that are handled in one small cell base station are also decreased considerably compared with amounts of transferred data that are handled when accommodating pieces of camera-captured image data from many vehicles 1 in a single macro-cell, and thus, it is possible that an increase in the system capacity of the small cell base station is suppressed.

As described above, in remote-type autonomous traveling system 100 according to the present embodiment, vehicle 1, as an example of the mobile body apparatus that has at least one vehicle-mounted camera FRC1, at least one vehicle-mounted camera FRC2, at least one vehicle-mounted camera DRC1, and at least one vehicle-mounted camera RRC1, and remote cockpit RCP, as an example of the remote operation terminal are communicatively connected. Vehicle 1 acquires the environmental information on vehicle 1, and, based on the environmental information, determines whether or not vehicle 1 is in the critical state. According to a result of the determination that vehicle 1 is in the critical state, by performing communication in compliance with the first communication scheme (for example, the single hop communication), vehicle 1 transmits at least the camera-captured image data to remote cockpit RCP through macro-cell base station CND1, as an example of the first wireless base station, that is capable of providing a macro-cell which has a comparatively large cell radius. Remote cockpit RCP generates the control signal for remotely causing vehicle 1 to travel autonomously, according to the camera-captured image data that is transmitted from vehicle 1, and transmits the generated control signal to vehicle 1 through macro-cell base station CND1 in the same manner.

Accordingly, in performing the autonomous traveling of vehicle 1, which is based on the remote control by remote cockpit RCP, remote-type autonomous traveling system 100 can not only suppress an increase in the allowable delay time for the transfer of the pieces of data of the images that are captured by one or more vehicle-mounted camera which are installed within vehicle 1, but can also avoid the insufficiency of the system capacity of the macro-cell in the macro-cell base station. In other words, a ratio indicating that vehicle 1 is in the critical state on an area that includes a road, such as public road PH, or a limited area is not necessarily high and is limited, and thus it can be considered that vehicles in the critical state, although depending on a spot, accounts for a small percentage (for example, approximately 10%) of all vehicles. For this reason, only the vehicle 1 in the critical state is caused to perform the single hop communication (one hop communication) with the macro-cell base station, and thus traffic load on macro-cell base station CND1 can be reduced. Thus, it is difficult for the insufficiency of the system capacity to occur. Because of this, congestion is also avoidable. Furthermore, only various pieces of camera-captured image data or sensor-detected data from vehicle 1 in the critical state are accommodated in the macro-cell of macro-cell base station CND1. Because of this, the frequency of occurrence of handover can be reduced when the various pieces of data are transferred to remote cockpit RCP, the endurance of the data arrival can be improved, and the remote driving can be easily realized. Particularly, if the limited area (for example, within a site that is owned by a company or the like, a university campus, or a large parking lot) is covered by a macro-cell, the handover does not occur in the entire limited area. Because of this, it is possible that a delay time of approximately 10 milliseconds (ms) is realized, and the likelihood of realizing the remote driving is improved.

Furthermore, according to a result of the determination that vehicle 1 is in the non-critical state, by performing the second communication scheme (for example, the multi-hop communication), vehicle 1 transmits at least the camera-captured image data to remote cockpit RCP through small cell base station ND1, as an example of each of the multiple second wireless base stations that are capable of providing a small cell which has a comparatively small cell. Accordingly, vehicle 1 in the non-critical state performs the multi-hop communication in which relay transfer is performed among the multiple small cell stations, and thus a short delay time of approximately 10 milliseconds (ms) is difficult to achieve, but there is no need to achieve a short delay time of approximately 10 milliseconds (ms). For example, a delay time of approximately 200 milliseconds (ms) to 1000 milliseconds (ms) is also allowed, and thus data transfer can be performed between vehicle 1 in the non-critical state and remote cockpit RCP. Furthermore, with the multi-hop communication that is available among multiple small cell base stations, there is no need to construct a wired backhaul circuit between each of the multiple small cell base stations and core network CNW. Because of this, it is possible that the installation of the small cell base station is simplified.

Furthermore, vehicle 1 transmits at least the camera-captured image data to the macro-cell base station that is capable of providing a macro-cell in compliance with cellular-based wireless standards (for example, LTE), by performing the single hop communication as the first communication scheme. On the other hand, vehicle 1 transmits at least the camera-captured image data to the small cell base station that is capable of providing a small cell in compliance with cellular-based wireless standards (for example, LTE) by performing the multi-hop communication in compliance with the second communication scheme. Accordingly, a rate of the time for which vehicle 1 is in the critical state is limited. Because of this, although the data (for example, the camera-captured image data or the sensor-detected data) that is transferred from vehicle 1 is accommodated in a macro-cell in compliance with the cellular-based wireless standards such as LTE, it is possible that an excessive increase in a communication fee which is incurred each time the macro-cell in compliance with the cellular-based wireless standards such as LTE is used is suppressed. On the other hand, the rate of the time for which vehicle 1 is in the non-critical state is higher than the rate of the time for which vehicle 1 is in the critical state. Therefore, in the non-critical state, the data (for example, the camera-captured image data or the sensor-detected data) that is transferred from vehicle 1 is transmitted to remote cockpit RCP through multiple small cell base stations by performing the multi-hop communication. For this reason, it is possible that amounts of transferred data that are handled in one small cell base station are also decreased considerably compared with amounts of transferred data that are handled when accommodating pieces of camera-captured image data from many vehicles 1 in a single macro-cell, and thus, it is possible that an increase in the system capacity of the small cell base station is suppressed.

Furthermore, vehicle 1 transmits at least the camera-captured image data to the macro-cell base station that is capable of providing a macro-cell in compliance with cellular-based wireless standards (for example, LTE), by performing the single hop communication as the first communication scheme. On the other hand, vehicle 1 transmits at least the camera-captured image data to the small cell base station that is capable of providing a small cell in compliance with non-cellular-based wireless standards (for example, a wireless LAN) by performing the multi-hop communication in compliance with the second communication scheme. Accordingly, a rate of the time for which vehicle 1 is in the critical state is limited. Because of this, although the data (for example, the camera-captured image data or the sensor-detected data) that is transferred from vehicle 1 is accommodated in a macro-cell in compliance with the cellular-based wireless standards such as LTE, it is possible that an excessive increase in a communication fee which is incurred each time the macro-cell in compliance with the cellular-based wireless standards such as LTE is used is suppressed. On the other hand, the rate of the time for which vehicle 1 is in the non-critical state is higher than the rate of the time for which vehicle 1 is in the critical state. Therefore, in the non-critical state, the data (for example, the camera-captured image data or the sensor-detected data) that is transferred from vehicle 1 is transmitted to remote cockpit RCP through multiple small cell base stations by performing the multi-hop communication. For this reason, it is possible that amounts of transferred data that are handled in one small cell base station are also decreased considerably compared with amounts of transferred data that are handled when accommodating pieces of camera-captured image data from many vehicles 1 in a single macro-cell, and thus, it is possible that an increase in the system capacity of the small cell base station is suppressed. Moreover, although vehicle 1 is in the non-critical state, a communication network (for example, a wireless LAN such as Wifi (a registered trademark)) for a non-cellular system is used. Because of this, although an amount of pieces data that are transferred from vehicle 1 increases, there is no massive increase in the communication fee. This contributes to suppression of cost increase.

Furthermore, vehicle 1 transmits at least the camera-captured image data to the macro-cell base station that is capable of providing a macro-cell in compliance with non-cellular-based wireless standards (for example, a wireless LAN), by performing the single hop communication as the first communication scheme. On the other hand, vehicle 1 transmits at least the camera-captured image data to the small cell base station that is capable of providing a small cell in compliance with non-cellular-based wireless standards (for example, a wireless LAN) by performing the multi-hop communication in compliance with the second communication scheme. Accordingly, a rate of the time for which vehicle 1 is in the critical state is limited. Because of this, although the data (for example, the camera-captured image data or the sensor-detected data) that is transferred from vehicle 1 is accommodated in a macro-cell in compliance with the cellular-based wireless standards such as LTE, it is possible that an excessive increase in a communication fee which is incurred each time the macro-cell in compliance with the cellular-based wireless standards such as LTE is used is suppressed. On the other hand, the rate of the time for which vehicle 1 is in the non-critical state is higher than the rate of the time for which vehicle 1 is in the critical state. Therefore, in the non-critical state, the data (for example, the camera-captured image data or the sensor-detected data) that is transferred from vehicle 1 is transmitted to remote cockpit RCP through multiple small cell base stations by performing the multi-hop communication. For this reason, it is possible that amounts of transferred data that are handled in one small cell base station are also decreased considerably compared with amounts of transferred data that are handled when accommodating pieces of camera-captured image data from many vehicles 1 in a single macro-cell, and thus, it is possible that an increase in the system capacity of the small cell base station is suppressed. Moreover, regardless of the state of vehicle 1, the dependence on the cellular system can be avoided using the communication network (for example, a wireless LAN such as Wifi (a registered trademark)) for the non-cellular system. Because of this, although amounts of data that are transferred from vehicle 1 increases, there is no massive increase in the communication fee. This contributes to suppression of cost increase. Particularly, if the entire limited area (for example, within a site that is owned by a company or the like, a university campus, or a large parking lot) is covered by a macro-cell or a small cell, without using the cellular system such as LTE in the entire limited area, it is possible that a small delay time of approximately 10 milliseconds (ms) is realized, and the likelihood of realizing the remote driving is improved.

The various embodiments are described above with reference to the drawings, but it goes without saying that the present disclosure is not limited to the examples in question. It is apparent to a person of ordinary skill that various modification examples or revision examples can be contemplated within the scope of a claim, and it is understood that these also justifiably fall within the technical scope of the present disclosure. Furthermore, the constituent elements in the embodiments, which are described above, may be voluntarily combined within the scope that does not depart from the gist of the present disclosure.

INDUSTRIAL APPLICABILITY

The present disclosure is useful in implementing a remote-type autonomous traveling system, a wireless communication method, a mobile body apparatus, and a program, in which an allowable delay time for transfer of pieces of data of images that are captured by one or more cameras that are installed within the mobile body apparatus is suppressed from increasing and in which the insufficiency of a system capacity of a macro-cell in a macro-cell base station is avoided.

REFERENCE MARKS IN THE DRAWINGS

1, CR1, CR2, CR3 VEHICLE (MOBILE BODY APPARATUS)
11 VEHICLE CONTROL UNIT
13 MEMORY
15 STORAGE
17 COMMUNICATION UNIT
111 REMOTE DRIVING DETERMINATION UNIT
112 VEHICLE ENVIRONMENTAL-INFORMATION ACQUISITION UNIT
113 SIGNAL MULTIPLEXING AND DEMULTIPLEXING UNIT
114 VEHICLE STATE DETERMINATION UNIT
115 COMMUNICATION SCHEME DETERMINATION UNIT
116 COMMUNICATION SCHEME SWITCHING UNIT
171 LTE SINGLE HOP COMMUNICATION MODULE
173 LTE MULTI-HOP COMMUNICATION MODULE
175 WLAN SIGNAL HOP COMMUNICATION MODULE
177 WLAN MULTI-HOP COMMUNICATION MODULE
AC1, ACm ACTUATOR
ANT ANTENNA
BT OPERATION BUTTON
CND1 MACRO-CELL BASE STATION (FIRST WIRELESS BASE STATION)
CND2, CND3, CND4 SMALL CELL BASE STATION
CNW CORE NETWORK
DRC1, FRC1, FRC2, RRC1 VEHICLE-MOUNTED CAMERA
MHP1 MULTI-HOP COMMUNICATION (SECOND COMMUNICATION SCHEME)
ND1, ND2, ND3, ND4, ND5, ND6 SMALL CELL BASE STATION (SECOND WIRELESS BASE STATION)
RCP REMOTE COCKPIT (REMOTE OPERATION TERMINAL)
S1, Sk, Sn SENSOR
SHP1, SHP2 SINGLE HOP COMMUNICATION (FIRST COMMUNICATION SCHEME)
ST STEERING WHEEL

The invention claimed is:

1. A mobile apparatus communicatively connected to a remote terminal that remotely controls autonomous driving of the mobile apparatus, the mobile apparatus comprising:
a camera; and
one or more processors, which are coupled to the camera and which, in operation,
acquire environmental information of the mobile apparatus;
determine, based on the environmental information, whether the mobile apparatus is in a critical state requiring low delay transmission of image data or in a non-critical state not requiring the low delay transmission of image data;
responsive to the mobile apparatus determined to be in the critical state, transmit image data captured by the camera to the remote terminal, via a first wireless base station capable of supporting a macro-cell, using a first communication scheme; and
responsive to the mobile apparatus determined to be in the non-critical state, transmit image data captured by the camera to the remote terminal, via a plurality of second wireless base stations capable of supporting a plurality of small cells, using a second communication scheme different from the first communication scheme.

2. The mobile apparatus of claim 1,
wherein
the image data is transmitted to the first wireless base station capable of supporting the macro-cell in compliance with cellular-based wireless standards, by performing single hop communication in compliance with the first communication scheme, and
the image data is transmitted to the second wireless base station capable of supporting the plurality of small cells in compliance with the cellular-based wireless standards, by performing multi-hop communication in compliance with the second communication scheme.

3. The mobile apparatus of claim 1,
wherein
the image data is transmitted to the first wireless base station capable of supporting the macro-cell in compliance with cellular-based wireless standards, by performing single hop communication in compliance with the first communication scheme, and
the image data is transmitted to the second wireless base station capable of supporting the plurality of small cells in compliance with non-cellular-based wireless standards, by performing multi-hop communication in compliance with the second communication scheme.

4. The mobile apparatus of claim 1,
wherein
the image data is transmitted to the first wireless base station capable of supporting the macro-cell in compliance with non-cellular-based wireless standards, by performing single hop communication in compliance with the first communication scheme, and the image data is transmitted to the second wireless base station capable of supporting the plurality of small cells in compliance with the non-cellular-based wireless standards, by performing multi-hop communication in compliance with the second communication scheme.

5. A remote-control-type autonomous driving system, comprising:

a mobile apparatus; and a remote terminal communicatively connected to the mobile apparatus, wherein the mobile apparatus includes:

a camera; and one or more processors, which are coupled to the camera and which, in operation, acquire environmental information of the mobile apparatus, determine, based on the environmental information, whether the mobile apparatus is in a critical state requiring low delay transmission of image data or in a non-critical state not requiring the low delay transmission of image data, responsive to the mobile apparatus determined to be in the critical state, transmit image data captured by the camera to the remote terminal, via a first wireless base station capable of supporting a macro-cell, using a first communication scheme, and responsive to the mobile apparatus determined to be in the non-critical state, transmit image data captured by the camera to the remote terminal, via a plurality of second wireless base stations capable of supporting a plurality of small cells, using a second communication scheme different from the first communication scheme, wherein the remote terminal, in response to the image data transmitted from the mobile apparatus, transmits a control signal for remotely controlling autonomous driving of the mobile apparatus, to the mobile body apparatus via the first wireless base station.

6. A wireless communication method in a remote-control-type autonomous driving system in which a mobile apparatus including a camera is communicatively connected to a remote terminal, the method comprising:

the mobile apparatus acquiring environmental information of the mobile apparatus;

the mobile apparatus determining, based on the environmental information, whether the mobile apparatus is in a critical state requiring low delay transmission of image data or in a non-critical state not requiring the low delay transmission of image data;

responsive to the mobile apparatus determined to be in the critical state, the mobile apparatus transmitting image data captured by the camera to the remote terminal, via a first wireless base station capable of supporting a macro-cell, using a first communication scheme;

responsive to the mobile apparatus determined to be in the non-critical state, the mobile apparatus transmitting image data captured by the camera to the remote terminal, via a plurality of second wireless base stations capable of supporting a plurality of small cells, using a second communication scheme different from the first communication scheme, and the remote terminal, in response to the image data transmitted from the mobile apparatus, transmitting a control signal for remotely controlling autonomous driving of the mobile apparatus, to the mobile apparatus via the first wireless base station.

7. The mobile apparatus of claim 1,
wherein the first communication scheme defines single hop communication and the second communication scheme defines multi-hop communication.

8. The system of claim 5,
wherein the first communication scheme defines single hop communication and the second communication scheme defines multi-hop communication.

9. The system of claim 5,
wherein
the image data is transmitted to the first wireless base station capable of supporting the macro-cell in compliance with cellular-based wireless standards, by performing single hop communication in compliance with the first communication scheme, and the image data is transmitted to the second wireless base station capable of supporting the plurality of small cells in compliance with the cellular-based wireless standards, by performing multi-hop communication in compliance with the second communication scheme.

10. The system of claim 5,
wherein
the image data is transmitted to the first wireless base station capable of supporting the macro-cell in compliance with cellular-based wireless standards, by performing single hop communication in compliance with the first communication scheme, and the image data is transmitted to the second wireless base station capable of supporting the plurality of small cells in compliance with non-cellular-based wireless standards, by performing multi-hop communication in compliance with the second communication scheme.

11. The system of claim 5,
wherein
the image data is transmitted to the first wireless base station capable of supporting the macro-cell in compliance with non-cellular-based wireless standards, by performing single hop communication in compliance with the first communication scheme, and the image data is transmitted to the second wireless base station capable of supporting the plurality of small cells in compliance with the non-cellular-based wireless standards, by performing multi-hop communication in compliance with the second communication scheme.

12. The method of claim 6,
wherein the first communication scheme defines single hop communication and the second communication scheme defines multi-hop communication.

13. The method of claim 6,
wherein
the image data is transmitted to the first wireless base station capable of supporting the macro-cell in compliance with cellular-based wireless standards, by performing single hop communication in compliance with the first communication scheme, and the image data is transmitted to the second wireless base station capable of supporting the plurality of small cells in compliance with the cellular-based wireless standards, by performing multi-hop communication in compliance with the second communication scheme.

14. The method of claim 6,
wherein
the image data is transmitted to the first wireless base station capable of supporting the macro-cell in compliance with cellular-based wireless standards, by performing single hop communication in compliance with the first communication scheme, and
the image data is transmitted to the second wireless base station capable of supporting the plurality of small cells in compliance with non-cellular-based wireless standards, by performing multi-hop communication in compliance with the second communication scheme.

15. The method of claim 6,
wherein
the image data is transmitted to the first wireless base station capable of supporting the macro-cell in compliance with non-cellular-based wireless standards, by performing single hop communication in compliance with the first communication scheme, and
the image data is transmitted to the second wireless base station capable of supporting the plurality of small cells in compliance with the non-cellular-based wireless standards, by performing multi-hop communication in compliance with the second communication scheme.

* * * * *